(12) United States Patent
Ashar

(10) Patent No.: US 11,423,753 B2
(45) Date of Patent: Aug. 23, 2022

(54) MULTI-WAY RESIDENTIAL SENSOR DEVICE PLATFORM

(71) Applicant: Nuro Technologies, Inc., Sunnyvale, CA (US)

(72) Inventor: Premal Ashar, Sunnyvale, CA (US)

(*) Notice: Subject to any disclaimer, the term of this patent is extended or adjusted under 35 U.S.C. 154(b) by 0 days.

(21) Appl. No.: 16/577,712

(22) Filed: Sep. 20, 2019

(65) Prior Publication Data
US 2020/0020219 A1  Jan. 16, 2020

Related U.S. Application Data

(63) Continuation of application No. 15/924,123, filed on Mar. 16, 2018, now Pat. No. 10,553,096, and a continuation of application No. 15/249,314, filed on Aug. 26, 2016, now Pat. No. 10,274,947.

(51) Int. Cl.
| | |
|---|---|
| G08B 21/02 | (2006.01) |
| G08B 21/00 | (2006.01) |
| G08B 21/04 | (2006.01) |
| G05B 15/02 | (2006.01) |
| H04L 12/28 | (2006.01) |

(52) U.S. Cl.
CPC ............ *G08B 21/02* (2013.01); *G05B 15/02* (2013.01); *G08B 21/00* (2013.01); *G08B 21/04* (2013.01); *G08B 21/043* (2013.01); *G08B 21/0415* (2013.01); *G08B 21/0423* (2013.01); *H04L 12/2807* (2013.01); *H04L 12/2816* (2013.01); *G05B 2219/163* (2013.01); *G05B 2219/25011* (2013.01); *G05B 2219/25168* (2013.01); *G05B 2219/2642* (2013.01); *H04L 12/2803* (2013.01); *Y02B 70/30* (2013.01); *Y04S 20/20* (2013.01)

(58) Field of Classification Search
None
See application file for complete search history.

(56) References Cited

U.S. PATENT DOCUMENTS

| | | | |
|---|---|---|---|
| 2003/0169171 A1 | 9/2003 | Strubbe et al. | |
| 2010/0318685 A1* | 12/2010 | Kraus | H04L 12/2836 709/249 |
| 2011/0137836 A1 | 6/2011 | Kuriyama et al. | |

(Continued)

*Primary Examiner* — Qing Yuan Wu
(74) *Attorney, Agent, or Firm* — Joseph L. Acayan

(57) ABSTRACT

Implementations generally relate to systems, apparatuses, and methods for a residential sensor device platform. In some implementations, a system includes a plurality of sensor devices. Each sensor device of the plurality of sensor devices communicates with a wireless router and with other sensor devices of the plurality of sensor devices. Each sensor device includes one or more sensors operative to sense conditions in a living space and includes one or more processors. The one or more processors operative to perform operations comprising determining one or more conditions in the living space, wherein at least one condition of the one or more conditions is associated with activity in the living space. The one or more processors are further operative to perform operations comprising sharing, with the other sensor devices, information associated with the one or more conditions. The one or more processors are further operative to perform operations comprising controlling one or more operations of one or more electrical controls based at least in part on the information associated with the one or more conditions.

19 Claims, 12 Drawing Sheets

(56) References Cited

U.S. PATENT DOCUMENTS

| | | |
|---|---|---|
| 2011/0156640 A1 | 6/2011 | Moshfeghi |
| 2013/0033363 A1 | 2/2013 | Gabara |
| 2013/0268124 A1* | 10/2013 | Matsuoka ........... H04L 12/2825 |
| | | 700/276 |
| 2014/0246993 A1 | 9/2014 | Catalano et al. |
| 2014/0324527 A1 | 10/2014 | Kulkarni et al. |
| 2014/0324615 A1 | 10/2014 | Kulkarni et al. |
| 2015/0096352 A1 | 4/2015 | Peterson et al. |
| 2016/0149720 A1 | 5/2016 | Hatae et al. |
| 2016/0189532 A1 | 6/2016 | Malhotra et al. |
| 2018/0122209 A1 | 5/2018 | Jefferson et al. |

\* cited by examiner

MULTI-WAY RESIDENTIAL SENSOR DEVICE PLATFORM

CROSS REFERENCE TO RELATED APPLICATIONS

This application is a continuation of U.S. patent application Ser. No. 15/924,123, entitled HEALTH APPLICATION FOR RESIDENTIAL ELECTRICAL SWITCH SENSOR DEVICE PLATFORM, filed on Mar. 16, 2018, which claims priority from U.S. Provisional Patent Application No. 62/473,896, entitled HEALTH APPLICATION FOR RESIDENTIAL ELECTRICAL SWITCH SENSOR DEVICE PLATFORM, filed on Mar. 20, 2017, and is a continuation of U.S. Pat. No. 10,274,947 (U.S. patent application Ser. No. 15/249,314), entitled RESIDENTIAL SENSOR DEVICE PLATFORM, filed on Aug. 26, 2016, and issued on Apr. 30, 2019, which claims priority from U.S. Provisional Patent Application No. 62/215,162, entitled RESIDENTIAL SENSOR DEVICE PLATFORM, filed on Sep. 8, 2015, which are hereby incorporated by reference as if set forth in full in this application for all purposes.

BACKGROUND

Home automation has been a long-term desire. Control systems enable aspects of a home such as lighting to be controlled. However, cost-effective and user-friendly home automation is still far away. Present home automation systems are expensive, hard to install, and difficult to update. Such home automation systems typically require a user to understand complicated and difficult instructions to control aspects of a home.

SUMMARY

Implementations generally relate to systems, apparatuses, and methods for a residential sensor device platform. In some implementations, a system includes a plurality of sensor devices. Each sensor device of the plurality of sensor devices communicates with a wireless router and with other sensor devices of the plurality of sensor devices. Each sensor device includes one or more sensors operative to sense conditions in a living space and includes one or more processors. The one or more processors operative to perform operations comprising determining one or more conditions in the living space, wherein at least one condition of the one or more conditions is associated with activity in the living space. The one or more processors are further operative to perform operations comprising sharing, with the other sensor devices, information associated with the one or more conditions. The one or more processors are further operative to perform operations comprising controlling one or more operations of one or more electrical controls based at least in part on the information associated with the one or more conditions.

Other aspects and advantages of the described implementations will become apparent from the following detailed description, taken in conjunction with the accompanying drawings, illustrating by way of example the principles of the described implementations.

DETAILED DESCRIPTION

Implementations generally relate to systems, apparatuses, and methods of a residential sensor device platform. As described in more detail below, various implementations of the residential sensor device platform provide an infrastructure within and around a residence that includes sensor-enabled devices within rooms of the residence, as well as exterior to the residence (e.g., outdoor lighting, exterior security devices, exterior water sprinklers, etc.). Furthermore, in some implementations, the residential sensor device platform provides learning of common usage patterns and automatically configures home automation. Some implementations provide the sensing of motion or activity, temperature, and daylight. Further, some implementations provide energy metering, autonomous and networked operation, and cloud intelligence.

As described in more detail herein, implementations provide distributed decision making intelligence at each sensor device for day-to-day use, as well as a network for advanced analytics and pattern and behavior learning. Implementations also provide an intelligent wireless mesh that is self-healing, self-learning, and expandable. Implementations also provide sensor devices in each room or living area of a residency, as well as external to a residency, where the sensor devices provide activity tracking, ambient light, temperature, energy metering, camera, air quality, carbon monoxide (CO) detection, etc. Implementations also provide an efficient, cost-effective, and user-friendly home Internet of Things (IoT) platform including ubiquitous digital, plug and play sensing, stand-alone operation, Wi-Fi mesh, distributed algorithms, self-learning, self-healing, etc.

Figure 1:
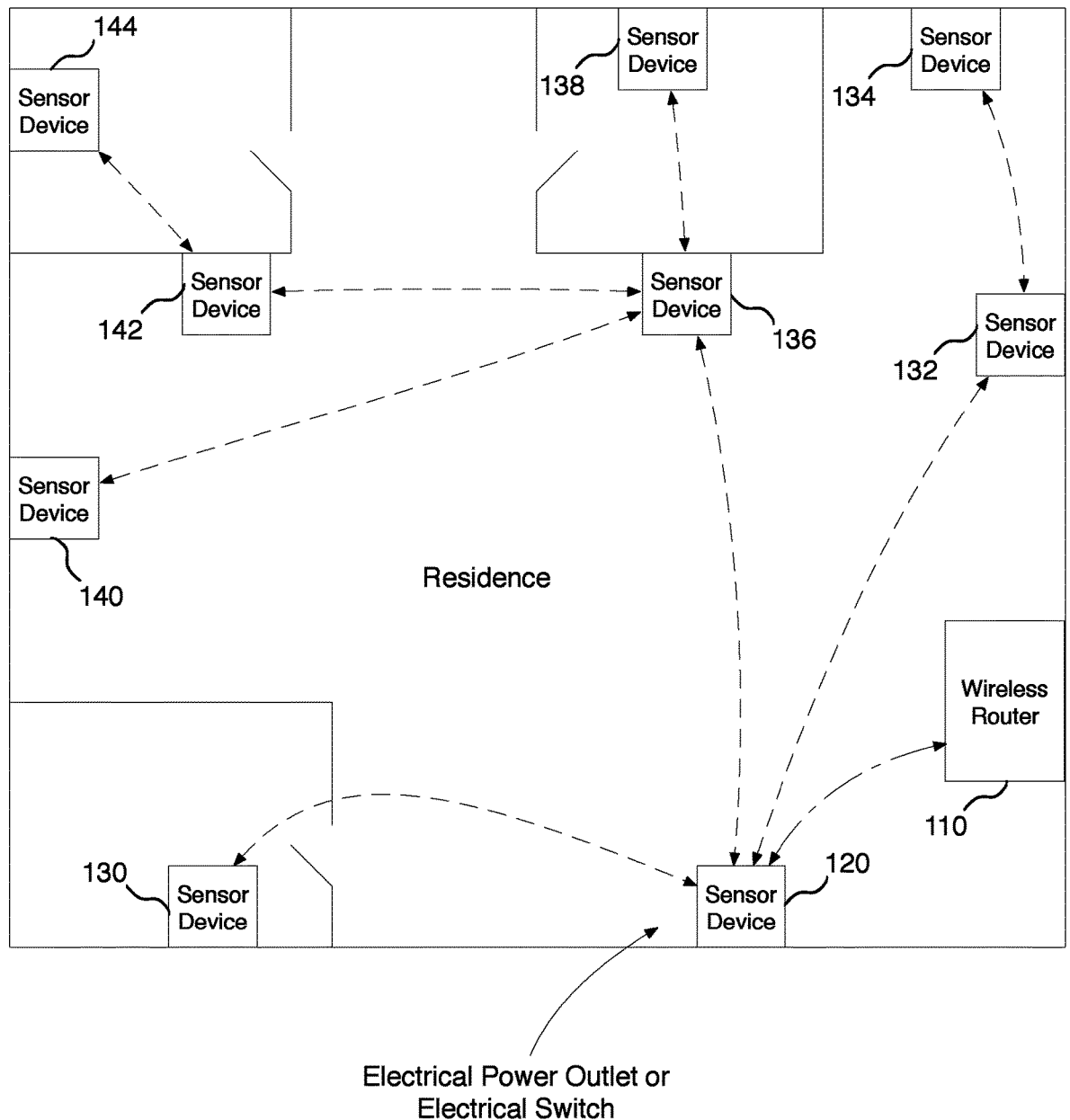
FIG. 1 illustrates a block diagram of an example residential sensor device platform, according to some implementations.

FIG. 1 illustrates a block diagram of an example residential sensor device platform 100, according to some implementations. In some implementations, the residential sensor device platform 100 includes a wireless router 110 and multiple sensor devices 120, 130, 132, 134, 136, 138, 140, 142, and 144. In various implementations, sensor devices 120, 130, 132, 134, 136, 138, 140, 142, and 144 form a wireless mesh network. In various implementations, at least one sensor of sensor devices 120, 130, 132, 134, 136, 138, 140, 142, and 144 maintains a communication link with wireless router 110.

In some implementation, one sensor device of sensor devices 120, 130, 132, 134, 136, 138, 140, 142, and 144 is operative as a master sensor device, which maintains the communications link with wireless router 110. As shown, in this particular implementation, sensor device 120 maintains the communication link with wireless router 110. As such, sensor device 120 may be referred to as a master sensor device. The other sensor devices 130, 132, 134, 136, 138, 140, 142, and 144 may be referred to as slave sensor devices.

In various implementations, the sensor device that is operative as the master sensor device may change over time. For example, as described in more detail below, if a master sensor device fails, another sensor device may be selected from among the plurality of sensor devices to be operative as the new master sensor device.

In some implementations, the non-master sensor devices 130, 132, 134, 136, 138, 140, 142, and 144 form a wireless mesh network. In various implementations, the master sensor device (e.g., sensor device 120) is also a part of the wireless mesh network. For example, in this case, master sensor device 120 and non-master sensor devices 130, 132, 134, 136, 138, 140, 142, and 144 form a wireless mesh network.

In some implementations, other devices (e.g., a mobile device, third-party device, etc.) may also be a part of the wireless mesh network. In some implementations, such other devices may join the wireless mesh network based on authentication. In some implementations, authentication may be controlled with layer two (L2) MAC pre-authorization for network access. In some implementations, authentication may be controlled by higher-level cloud authentication to enable services.

As shown in FIG. 1, in various implementations, each of non-master sensor devices 130, 132, 134, 136, 138, 140, 142, and 144 are either directly coupled to master sensor device 120, or are indirectly coupled to master sensor device 120 through another of the non-master sensor devices. In some implementations, the wireless mesh network operates over at least one link or interface that is different from a link or interface that is the communication link between master sensor device 120 and wireless router 110.

In various implementations, residential sensor device platform 100 is self-healing. For example, any sensor device may function as a master sensor device. If a particular master sensor device becomes inoperable, another sensor device may take over as the master sensor device. In other words, the role of a master sensor device may change over time. In some implementations, the master sensor device may be the sensor device closest to the wireless router. In some implementations, the master sensor device may be the sensor device that first detects a motion or activity.

In some example implementations, sensor device 120 may be referred to as master sensor device 120. However, other sensor devices may also function as master sensor devices. Also, in some scenarios, sensor device 120 may function as a slave sensor device relative to another master sensor device. In some implementations, residential sensor device platform 100 may include multiple different master sensor devices at a given time. For example, there may be multiple master sensor devices for different applications.

In various implementations, the sensor devices of residential sensor device platform 100 may be referred as a hybrid mesh, because the sensor devices may have functions and capabilities of a wireless mesh network, and the sensor devices may also have one or more master sensor devices simultaneously or serially. In various implementations, the sensor devices of residential sensor device platform 100 may include point-to-point plus repeater functionality.

Link or interface differentiation between the master sensor device 120 and the mesh versus the master 120 and the wireless router 110 may be achieved according to the following implementations. For example, in various implementations, the different links are dual interfaces in that one interface is among sensor devices of a mesh network, and a different, separate interface is between the master sensor device (e.g., master sensor device 120) and a wireless router (e.g., wireless router 110). In various implementations, the different links may be implemented as a dual interface or dual channel using a common radio, or multiple links or channels of a common radio.

As shown by the exemplary residential sensor device platform 100 of FIG. 1, sensor devices 130, 132, and 136 are directly coupled to master sensor device 120. Furthermore, as shown, sensor devices 134, 140, and 142 are indirectly coupled to master sensor device 120 through sensor devices 130, 132, and 136. Sensor devices 130, 132, and 136 can be designated as first order wireless mesh network nodes that are one wireless hop from master sensor device 120. Sensor devices 134, 140, and 142 can be designated as second order wireless mesh nodes that are two wireless hops from master sensor device 120. Furthermore, sensor device 144 is indirectly coupled to the master sensor device through sensor devices 142, and can be designated as a third order wireless mesh node that is three wireless hops from master sensor device 120.

In some implementations, one or more processors of respective sensor devices 120, 130, 132, 134, 136, 138, 140, 142, and 144 are operative to select the master sensor device from the plurality of sensor devices, where the master sensor device maintains communication with upstream wireless router 110. In various implementations, as indicated above, the other sensor devices of the plurality of wireless sensor devices are designated as slave sensor devices. In various implementations, the plurality of wireless devices 120, 130, 132, 134, 136, 138, 140, 142, and 144 form a wireless mesh network through wireless communication through their respective second transceivers.

In some implementations, each sensor device checks or determines its proximity to the access point or upstream wireless router 110. In some implementations, the proximity is estimated based on the signal strength or signal quality of signals received by the device from the upstream wireless router 110. The sensor device having the highest received signal strength of the highest signal quality wins. That sensor device with the highest signal quality is selected as the master sensor device, and the other sensor devices are designated as the slave sensor devices. In some implementations, the sensor device closest to a home access point becomes the master sensor device with dual interface (e.g., active, active). The other sensors devices become slaves and participate in client mode (e.g., active, passive).

In some implementations, mobile applications may directly connect to any sensor device. In some implementations, each sensor device may configure itself through network sharing (e.g., physical unclonable function (PUF) and/or advanced encryption standard (AES) 128-bit encryption, etc.). In various implementations, third-party devices may participate in the quasi-mesh network if authenticated. In some implementations, slave devices send data to a master device every predetermined time period (e.g., every 10 minutes, 15 minutes, etc.), which is configurable. In some implementations, a master sensor device packages data from all devices in a predetermined time period (e.g., 10-minute window, 15-minute window, etc.), and pushes the data to the cloud server, which in turn may push the data to one or more applications at predetermined time periods (e.g., every 10 minutes, 15 minutes, etc.). In some implementations, one or more applications may automatically synchronize data with the cloud servers at predetermined time interviews (e.g., hourly basis, etc.) if data is not pushed from the cloud server. Real-time info may be available on refresh or based on event policies. Applications directly interact with local devices.

In some implementations, if the selected master sensor device fails, the one or more processors of the plurality of sensor devices reselect the master sensor device from the plurality of sensor devices. That is, the wireless mesh network formed by the plurality of sensor devices 120, 130, 132, 134, 136, 138, 140, 142, and 144 is operative to configure themselves to self-configure or self-heal if one or more of the sensor devices fail. For example, in some implementations, the self-healing may include sensor devices of the wireless mesh network selecting a new master sensor device if the present master sensor device fails. In various implementations, all sensor devices have dual link, uplink, and mesh link functionality, and any of the currently non-master sensor devices may be eligible to become a new master device. In some implementations, a sensor device that was previously a master sensor device and that was later replaced (e.g., due to failure or other reason, etc.) may again be selected as the new master sensor device based on one or more predetermined criteria (e.g., getting fixed, etc.).

In some implementations, the self-healing includes selecting new routing paths from the master device to downstream sensor devices if one or more of the sensor devices 120, 130, 132, 134, 136, 138, 140, 142, and 144 of the residential sensor device platform 100 fails. In various implementations, meshing functionality of the sensor devices provides auto-range extender functionality for other devices to participate as network service provider.

In some implementations, the signal strength or quality determination and rankings are further used to identify the second best and/or third best signal strengths, and the sensor devices are ranked accordingly. These sensor devices can be used as backup master sensor devices if the current master sensor device fails for some reason. In various implementations, the ranking is based on signal strengths may be used to determine a priority for backup. For example, in some implementations, the highest ranking sensor device may be selected as the master sensor device. If the highest ranking sensor device is not available, the next highest ranking sensor device may be selected as the master sensor device. If there is a tie, the master sensor device may be selected randomly or based on another aspect (e.g., proximity, etc.).

In some implementations, one or more of the plurality of sensor devices 120, 130, 132, 134, 136, 138, 140, 142, and 144 are associated with one or more electrical power outlets and/or and one or more electrical light switches. In some implementations, the one or more of the plurality of sensor devices 120, 130, 132, 134, 136, 138, 140, 142, and 144 associated with the electrical power outlet or the electrical light switch is located within a common or same housing as the electrical power outlet or the electrical light switch.

In various implementations, each of the one or more processors of the one or more respective sensor devices 120, 130, 132, 134, 136, 138, 140, 142, and 144 is operative to control operation of the electrical control (which may in turn control one or more electrical power outlets and/or one or more electrical light switches) based on at least the sensed condition of the living space. In some implementations, the sensed condition may be based on various types of sensors (e.g., a light sensor, a motion sensor, a thermometer, a barometer, etc.) indicating various aspects of the living space. As shown in FIG. 1, the living space may include all of the habitable residence space associated with example residential sensor device platform 100. In some implementations, the living space may refer to particular rooms or areas associated with example residential sensor device platform 100.

In various implementations, each of the one or more processors of the one or more respective sensor devices 120, 130, 132, 134, 136, 138, 140, 142, and 144 is operative to control operation an the electrical control (which may in turn control one or more electrical power outlets and/or one or more electrical light switches) based on at least the sensed occupancy of the living space. In some implementations, the sensed occupancy may be based on a motion sensor indicating that the living space is being occupied by a person. In some implementations, the sensed occupancy may include a sensed occupancy of a space proximate to the one or more sense devices. In some implementations, the sensed condition includes a sensed occupancy.

In various implementations, the sensor device may detect not only sensed occupancy but may also detect activity, and distinguish among different objects such as humans, pets, robots, appliances, machinery, etc. For example, the sensor device may determine room usage based on movement patterns, type of motion or activity, size or magnitude of motion or activity, etc. In various implementations, the sensor device may detect particular activities in human behavior that occur in the living space (e.g., walking, running, falling, etc.). Based on this activity information, the sensor device may determine if the occupant is a person, pet (e.g., dog, cat, etc.), or other object.

In various implementations, the sensed conditions and/or the sensed occupancy may be shared over the mesh network to control one or more of the power outlets or one or more of the electrical switches, such as electrical light switches, etc. The control may include turning the power of the one or more power outlets on or off, or switching the one or more electrical switches on or off. For example, a master sensor device may communicate wirelessly with one or more other sensor devices in another room. The master sensor device may cause those one or more sensor devices to turn the power of the one or more respective power outlets on or off, or to switch one or more respective electrical switches on or off in the same room where the master sensor devices is located or in other rooms of the living space.

In various implementations, the master sensor device may receive sensed conditions and/or sensed occupancy information from one or more other sensor devices in the same room and/or in one or more other rooms. In various implementations, the sensed conditions may include environment conditions and information (e.g., temperature, lighting, energy consumption, etc.). The master sensor device may then cause the electrical controls of those other sensor devices to turn on or off respective power outlets and/or electrical switches in those respective rooms based at least in part on the information associated with the one or more conditions, including sensed conditions and information and sensed occupancy information.

In some implementations, one or more processors of the one or more of the plurality of sensor devices 120, 130, 132, 134, 136, 138, 140, 142, and 144 are operative to at least partially control operation of another device. In some implementations, the other devices may include one or more of a water heater, watering systems, garage door, etc. The sense information of the one or more of the plurality of sensor devices 120, 130, 132, 134, 136, 138, 140, 142, and 144 can be used to determine a condition of the other device, and advantageously control the other device. For example, sensed occupancy (or the lack of) can be used to determine whether a water heater should be active or not. Generally, the other devices need not necessarily have a sensor. Such devices may rely on sensing information of one of the plurality of sensor devices.

In some implementations, one or more processors of the one or more of the plurality of sensor devices 120, 130, 132, 134, 136, 138, 140, 142, and 144 are operative to at least partially control operation of the sensor devices themselves or another device based on timing. For example, situations can include control of certain lights of a residence that need to be turned on, for example, at 8:00 PM, but ideally also take in account occupancy within the residence. For example, front lights of a residence and back lights of the residence may be controlled differently depending upon occupancy within the residence.

In some implementations, one or more processors of the one or more of the plurality of sensor devices 120, 130, 132, 134, 136, 138, 140, 142, and 144 are operative to at least partially control operation of themselves or another device based on environmental parameters.

In some implementations, one or more processors of the one or more of the plurality of sensor devices 120, 130, 132, 134, 136, 138, 140, 142, and 144 are operative to monitor behavior of users of the living space, to receive and store the sensed condition over time, and to analyze the sensed condition to identify user behavior. In various implementations, local decisions and control are performed due to processing at each device. In other words, there is no network dependency to perform implementations described herein. In various implementations, multiple load settings may be achieved due to sensing, decisions, and controls residing on the same device.

In some implementations, the wireless mesh network further includes non-sensor devices that communicate with at least a portion of the plurality of sensor devices of the wireless mesh network. Such non-sensor devices can include heaters, water heaters, and/or alarm systems.

Figure 2:
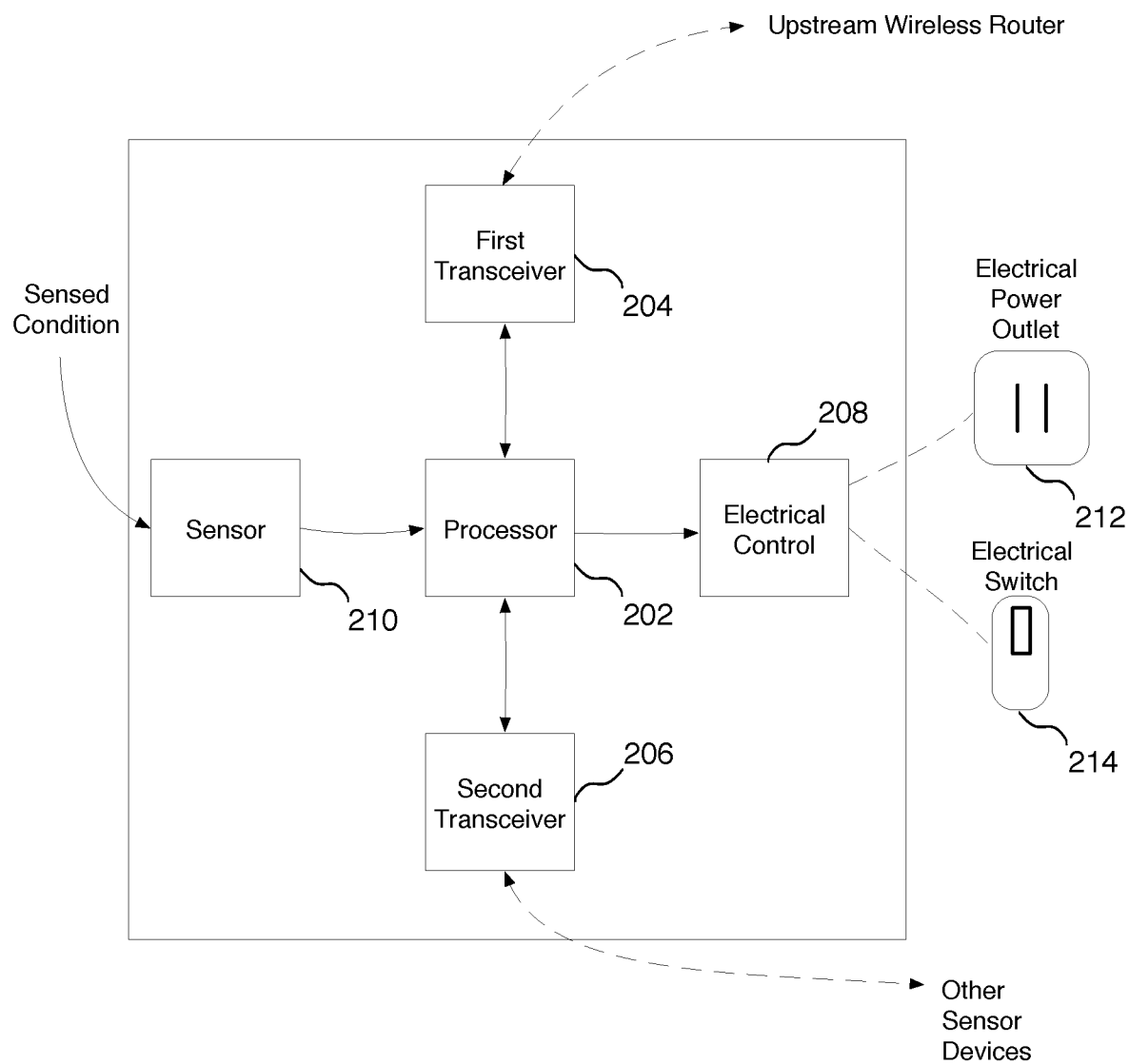
FIG. 2 illustrates a block diagram of an example sensor device, according to some implementations.

FIG. 2 illustrates a block diagram of an example sensor device 200, according to some implementations. In various implementations, sensor device 200 is a residential sensor device that is implemented in residential environments. Sensor device 200 may also be referred to as residential sensor device 200. Sensor device 200 is not limited to residential environments and may be implemented in non-residential environments.

As shown, for this particular implementation, residential sensor device 200 may be used to implement one or more of multiple sensor devices in a network, such as a wireless network, a wireless mesh network, etc.

In various implementations, when a first sensor device is configured, the rest of the sensor devices are self-configuring in that they automatically configure themselves based on the configuration of the first sensor device.

As described in more detail below, sensor device 200 has a multi-virtual network interface (e.g., a dual interface, etc.). In some implementations, one interface may be used for an uplink mode (e.g., Internet mode) to link to a wireless router, etc. In some implementations, a second interface may be used for a mesh mode to link to mesh nodes, etc. For example, in various implementations, sensor device 200 includes a controller or processor 202. In various implementations, sensor device 200 also includes a first transceiver 204 operative to support uplink communication with a wireless router. In various implementations, the wireless router is an upstream wireless router. Sensor device 200 also includes a second transceiver 206 operative to support mesh link communication with other sensor devices of the plurality of sensor devices. Sensor device 200 also includes an electrical control 208 that controls one or more electrical power outlets 212 and/or one or more electrical switches 214. In various implementations, sensor device 200 includes a sensor 210 operative to sense a condition of a living space. For ease in illustration, one sensor 210 is shown. However, in various implementations, sensor 210 may represent multiple sensors. For example, sensor device 200 may include a light sensor, a motion sensor, a thermometer, a barometer, a moisture sensor, etc. In some implementations, processor 202 is operative to communicate with the wireless router through the first transceiver, communicate with other sensor devices of the plurality of sensor devices through the second transceiver, and receive the sensed condition of the living space.

In various implementations, if sensor device 200 functions as a master sensor device, sensor device 200 is configured with a dual link, having both an uplink to the upstream wireless mesh router and a mesh link to the other sensor devices of the mesh network. In various implementations, the other sensor devices of the mesh network (e.g., slave sensor devices) are configured only with the mesh link.

If any new sensor device is added to the mesh network, the new sensor device may self configure similar to the other non-master sensor devices of the wireless mesh network. As such, implementations provide automatic-range extender functionality.

In various implementations, one or more processors of the plurality of sensor devices are operative to select a master sensor device from the plurality of sensor devices, where the master sensor device maintains communication with the wireless router, and where other sensor devices of the plurality of sensor devices are designated as slave sensor devices and form a wireless mesh network with the other sensor devices through wireless communication with the other sensor devices through the second transceivers of the slave sensor devices.

For ease of illustration, FIG. 2 shows one block for each of processor 202, first transceiver 204, second transceiver 206, electrical control 208, sensor 210, electrical power outlet 212, and electrical switch 214. Each of blocks 202, 204, 206, 208, 210, 212, and 214 may represent multiple first transceivers, second transceivers, electrical controls, sensor devices, processors, electrical power outlets, and electrical switches.

In other implementations, sensor device 200 may not have all of the components shown and/or may have other elements including other types of elements instead of, or in addition to, those shown herein. For example, sensor device 200 may be implemented by computing device 1200 of FIG. 12, which is described in more detail below. In various implementations, sensor device 200 may include a combination of some or all of the elements shown in FIGS. 2 and 12, and may include other types of elements instead of, or in addition to, those shown in FIGS. 2 and 12.

Figure 3:
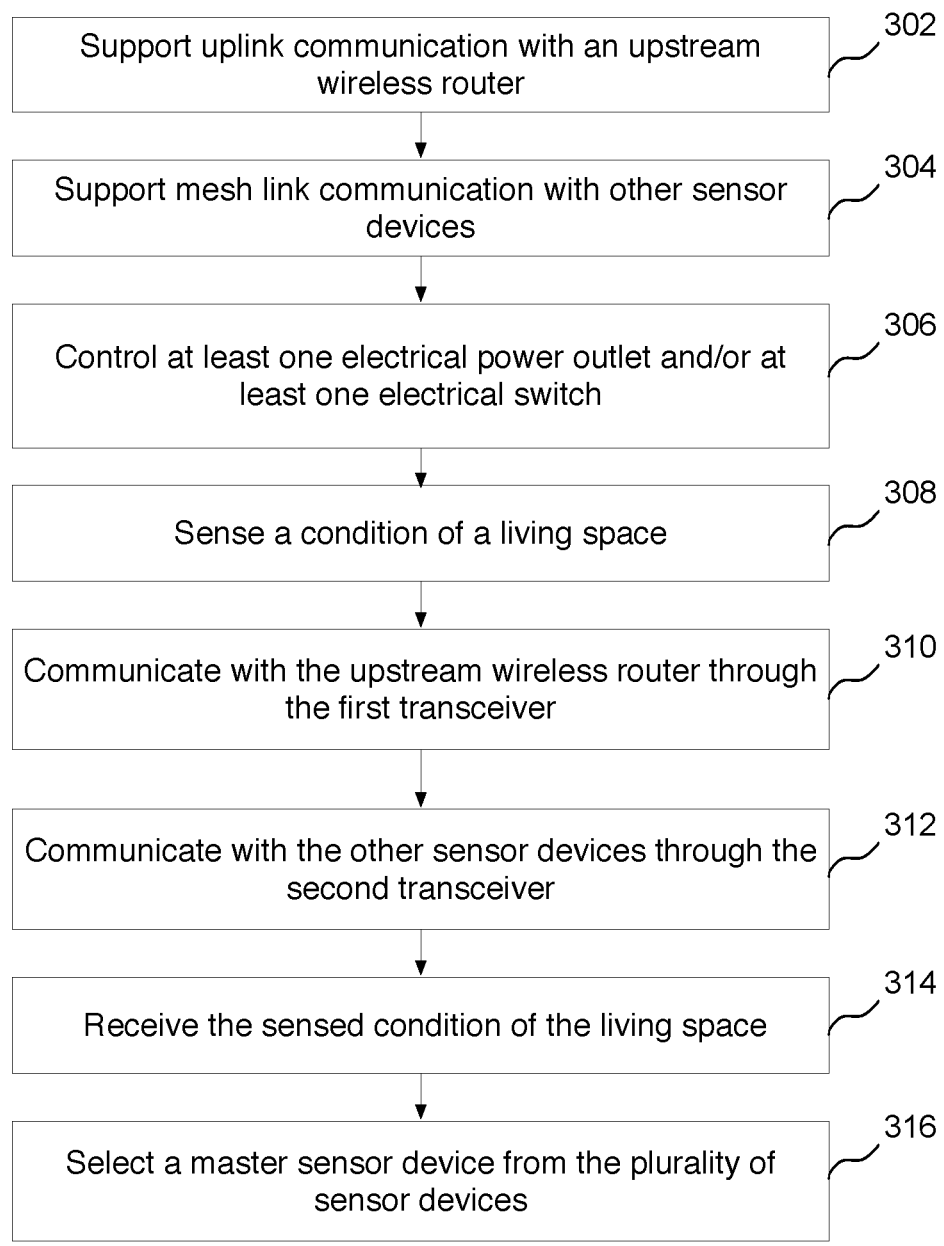
FIG. 3 illustrates an example flow diagram for operating a residential sensor device platform, according to some implementations.

FIG. 3 illustrates an example flow diagram for operation of a residential sensor device platform, according to some implementations. For ease of illustration, example implementation steps are described in the context of a single sensor device, such as sensor device 200. These implementations and others may apply to any sensor device, such as any one or more sensor devices of FIG. 1.

Referring to both FIGS. 2 and 3, a method is initiated in block 302, where sensor device 200 supports, by utilizing first transceiver 204, uplink communication with an upstream wireless router. As described in more detail below, sensor device 200 supports the uplink communication with the upstream wireless router by utilizing first transceiver 204.

In block 304, sensor device 200 supports, by utilizing second transceiver 206, a mesh link communication with other sensor devices of a plurality of sensor devices (e.g., other sensor devices of FIG. 1). As described in more detail below, sensor device 200 supports the mesh link communication with the other sensor devices by utilizing second transceiver 206.

In block 306, sensor device 200 controls at least one electrical power outlet and/or at least one electrical switch. In various implementations, sensor device 200 controls one or more electrical power outlets and/or one or more electrical switches by utilizing electrical control 208. As indicated herein, sensor device 200 controls other sensor devices wirelessly. The other sensor devices may located in the same room as sensor device 200 and/or in other rooms of the living space. Such other sensor devices in turn control non-sensor devices such as one or more electrical power outlets and/or one or more electrical switches by utilizing respective electrical controls of those switches. These non-sensor devices communicate with one or more respective sensor devices of the wireless mesh network via the electrical control of the respective sensor devices (e.g., electrical control 208 of sensor device 200, etc.).

In block 308, sensor device 200 senses the condition of a living space. In various implementations, sensor device 200 senses the condition of the living space using one or more sensors. In various implementations, each sensor detects different condition aspects of the environment. For example, the sensors may include a light sensor, an activity monitoring or movement sensor, a temperature sensor, camera, microphone, etc.

In block 310, sensor device 200 communicates with the upstream router (e.g., wireless router 110) through first transceiver 204. In block 312, sensor device 200 communicates with the other sensor devices of the plurality of sensor devices through second transceiver 206.

In block 314, sensor device 200 receives the sensed condition of the living space. For example, sensor device 200 may receive environmental information (e.g., amount of light, movement, temperature, etc.) from one or more sensors 210.

In block 316, sensor device 200 selects a master sensor device from the plurality of sensor devices. As described in more detail herein, the different sensor devices of the plurality of sensor devices selects a master device. In various example implementations described herein, sensor device 200 is selected as the master sensor device.

In various implementations, one or more processors of the plurality of respective sensor devices perform the selection of the master sensor device. As described herein, the sensor device of the plurality of sensor devices that maintains communication with the upstream router is designated as the master sensor device. The other sensor devices of the plurality of wireless devices are designated as slave sensor devices. Also, the slave devices forming a wireless mesh network with other sensor devices communicate via wireless communication via their respective second transceivers.

As indicated herein, sensor device 200 as well as other sensor devices wirelessly communicate with each other in a mesh network and with the upstream router. As such, sensor device 200 is operative to receive sensed conditions and information, as well as sensed occupancy information from other sensor devices in other rooms. Sensor device 200 is operative to wirelessly control one or more operations of one or more electrical controls based at least in part on the information associated with the one or more conditions (e.g., sensed conditions and information, sensed occupancy information, etc.). For example, sensor device 200 may wirelessly cause one or more other sensor devices in the same room and/or one or more other respective rooms to turn on and/or off electrical outlets electrical switches based on the conditions in the living space. For example, similar to how any one electrical switch of a 3-way switch configuration may control lights in a given room, sensor device 200 may function as a multi-way device or switch that may control lights, electrical outlets, electrical switches by wirelessly controlling its own electrical control (e.g., electrical control 208) or the electrical controls of other sensor devices in the same room as sensor device 200 and/or in other rooms of the living space.

Similarly, sensor device 200 shares information associated with sensed conditions (e.g., environment conditions, etc.) that sensor device 200 collects in the living environment or at least in the room or rooms in the overall living environment that sensor device 200 collects via associated sensors. Another sensor device may in turn function as a master device and cause sensor device 200 to control one or more operations of one or more electrical controls associated with sensor device 200. Such control of operations of sensor device 200 may be based at least in part on the information associated with the one or more conditions determined by sensor device 200.

Although the steps, operations, or computations may be presented in a specific order, as shown in the example of FIG. 3, the order may be changed in particular implementations. The ordering of blocks 302 through 316 is merely one example ordering. Other orderings of the blocks/steps are possible, depending on the particular implementation. For example, block 302 and block 304 may occur simultaneously. In another example, block 308 may occur before block 306. In another example, block 310 and block 312 may occur simultaneously or in any order. In another example, block 314 may occur before block 306. These are merely example variations, and other variations are possible depending on the particular implementation. In some particular implementations, multiple steps shown as sequential in this specification may be performed at the same time. Also, some implementations may not have all of the steps shown and/or may have other steps instead of, or in addition to, those shown herein.

Although specific implementations have been described and illustrated, the described implementations are not to be limited to the specific forms or arrangements of parts so described and illustrated.

In the various implementations described herein, a processor of sensor device 200 of FIG. 2 and/or a processor of any sensor device of FIG. 1 may cause one or more elements described herein (e.g., information associated with sensed conditions, information associated with one or more electrical power outlets, information associated with one or more electrical switches, etc.) to be displayed in a user interface on one or more display screens.

While sensor device 200 (or computing device 1200) is described as performing the steps as described in the implementations herein, any suitable component or combination of components of sensor device 200 or computing device 1200 or any suitable processor or processors associated with system 102 sensor device 200 or computing device 1200 may perform the steps described.

Figure 4:
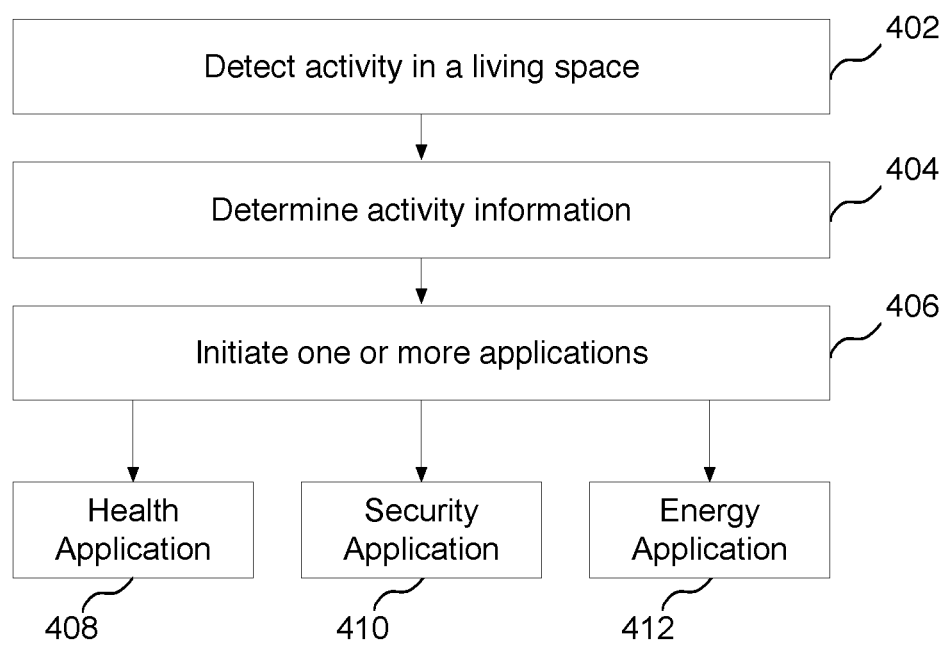
FIG. 4 illustrates an example flow diagram for operation of one or more applications associated with one or more sensor devices, according to some implementations.

FIG. 4 illustrates an example flow diagram for operation of one or more applications associated with one or more sensor devices, according to some implementations. For ease of illustration, example implementation steps described herein are described in the context of a single sensor device, such as sensor device 200. These implementations and others may apply to any sensor device, such as any one or more sensor devices of FIG. 1.

Referring to both FIGS. 1 and 4, a method is initiated at block 402, where sensor device 200 detects activity in a living space. Activity may include, for example, a person entering a room, a person making a motion from a still position, etc.

At block 404, sensor device 200 determines activity information associated with the activity. In various implementations, the sensor may detect particular activities in human behavior that occur in the living space (e.g., walking, running, falling, etc.). For example, a person may stand up from a sitting position. The person may walk across a room. The person may enter a room from another room. In some implementations, sensor device 200 may determine which other room the person came from by obtaining activity information from the last sensor device that detected activity information of the person. In various implementations, sensor device 200 aggregates activity information from itself and other sensor devices if available. Sensor device 200 also automatically sends aggregated activity information to other sensor devices directly and/or via a wireless router.

In some implementations, sensor device 200 determines if it is in a vacation mode. As described in more detail herein, in various implementations, applications running on sensor device 200 may perform different steps depending on whether sensor device 200 is in vacation mode or not. The various types of activity information may depend on the particular implementation and is described in more detail herein.

In some implementations, sensor device 200 may detect activity when the sensor device is on vacation mode (e.g., the user is on vacation). In some implementations, a sensor device may detect activity when the device is in an inactive mode (e.g., when the user is supposed to be inactive). In some implementations, a sensor device might not detect activity when the user is supposed to be active within and during certain periods. As such, the sensor device may issue an alert. In some implementations, the sensor device may pair up with other devices to detect other specifics (e.g., a possible fall that the user has taken).

At block 406, sensor device 200 initiates one or more applications to perform various functions. In various implementations, sensor device 200 provides a unified single device platform for multiple applications or services, which are described in more detail herein. In various implementations, the particular applications that sensor device 200 initiations may depend on the activity information.

At block 408, sensor device 200 initiates a health application. In some implementations, sensor device 200 may initiate the health application based on predetermined behavioral patterns that sensor device 200 detects. For example, in some implementations, sensor device 200 may initiate the health application when sensor device 200 detects that the person is not taking enough breaks during the user's routine tasks. In some implementations, sensor device 200 may initiate the health application when sensor device 200 detects that the person is not moving after a predetermined period of time (e.g., after a fall, etc.). In some implementations, sensor device 200 may initiate a health application when sensor device 200 detects that the user is not moving at predetermined intervals. As described in more detail herein, when the health application detects adverse health events, the health application performs various health-related functions.

At block 410, sensor device 200 initiates a security application. In some implementations, sensor device 200 may initiate the security application based on predetermined behavioral patterns that sensor device 200 detects. For example, in some implementations, sensor device 200 may initiate the security application when sensor device 200 detects that the person is entering the residence through non-legitimate means (e.g., not through the front door, through a patio door, through a garage door, through a window, etc.), especially when residence is supposed to be empty (e.g., during the day, when sensor device 200 is on vacation mode, etc.). As described in more detail herein, when the security application detects intrusion events, the security application performs various security-related functions.

At block 412, sensor device 200 initiates an energy application. In some implementations, sensor device 200 may initiate the energy application based on predetermined behavioral patterns that sensor device 200 detects. For example, in some implementations, sensor device 200 may initiate the energy application when the entire house is vacant (e.g., in vacation mode, etc.). For example, in some implementations, the energy application may lower the temperature of the water heater to a low-energy mode and subsequently raise the temperature of the water heater to a normal mode sometime before the house is occupied (e.g., no longer in vacation mode, etc.). Also, sensor device 200 may switch off lights and other loads may automatically when the entire house is vacant, with exception to lights that may be turned on periodically for security purposes (e.g., to give the appearance of someone being home, etc.). As described in more detail herein, when the energy application facilitates energy conservation, the energy application performs various energy-related functions.

Figure 5:
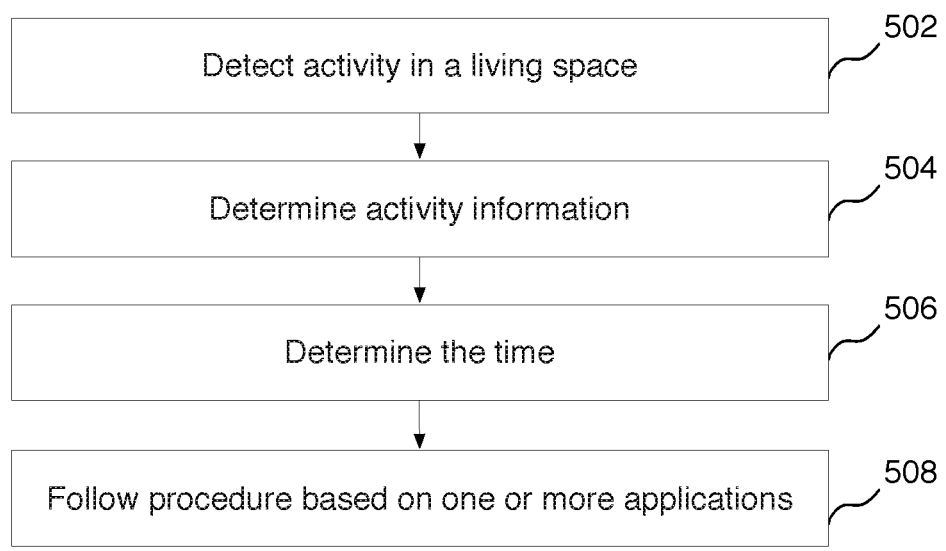
FIG. 5 illustrates an example flow diagram for operation of a sensor device, according to some implementations.

FIG. 5 illustrates an example flow diagram for operation of a sensor device, according to some implementations. For ease of illustration, example implementations are described herein in the context of a single sensor device, such as sensor device 200. These implementations and others may apply to any sensor device, such as any one or more sensor devices of FIG. 1.

Referring to both FIGS. 2 and 5, a method is initiated at block 502, where sensor device 200 detects activity in a living space. As indicated herein, activity may include, for example, a person entering a room, a person making a motion from a still position, etc.

At block 504, sensor device 200 determines activity information associated with the activity. In some implementations, the activity information is associated with the activity of the person detected. For example, a person may stand up from a sitting position. The person may walk across a room. The person may enter a room from another room.

As described in more detail herein, in various implementations, activity and activity information generated at block 502 and block 504 may trigger the one or more applications to perform various functionalities.

In various implementations, in various implementations, the sensor devices of residential sensor device platform 100 socialize with each other by sharing information with each other and learning from each other. For example, in various implementations, sensor device 200 exchanges activity information with other sensor devices in the network of sensor devices via a master sensor device and/or wireless router. For example, sensor device 200 may send activity information to one or more other sensor devices. Sensor device 200 may also receive activity information from one or more other sensor devices. As indicated above, the activity information may be exchanged among sensor devices via a master sensor device and/or wireless router. In some implementations, sensor device 200 may function as the master device.

In various implementations, the sensor devices share information and socialize based on one or more attributes associated with the sensor devices. Different sensor devices may share intelligence with other sensor devices in order to optimize protocols of the software applications associated with the residential electrical switch sensor device platform (e.g., health application, security application, energy application, etc.). In some implementations, one attribute may be a particular group to which a given sensor device belongs. For example, one or more sensor devices may belong to a particular ambient sensor group. One or more sensor devices may belong to a particular physical location (e.g., a particular room, a particular portion of a house, etc.). In some implementations, a group of sensor devices need not be in the same house.

In various implementations, one or more sensor devices may be a part of multiple groups, where each group may serve one or more different purposes. For example, a group of sensor devices may be implemented in connection a health application, a security application, an energy application, etc.

At block 506, sensor device 200 determines the time. For example, sensor device 200 may determine that the time is 10:00 am, 2:00 pm, or 7:00 pm, etc. In some implementations, sensor device 200 may also determine a date associated with the time.

At block 508, sensor device 200 follows a procedure based on one or more applications. In various implementations, one or more devices take action not based on the activity information, but based on one or more applications. For example, as described in more detail herein, sensor device 200 may follow a schedule based on the time and based on any one or more applications such as a health application, a security application, energy application, etc.

Figure 6:
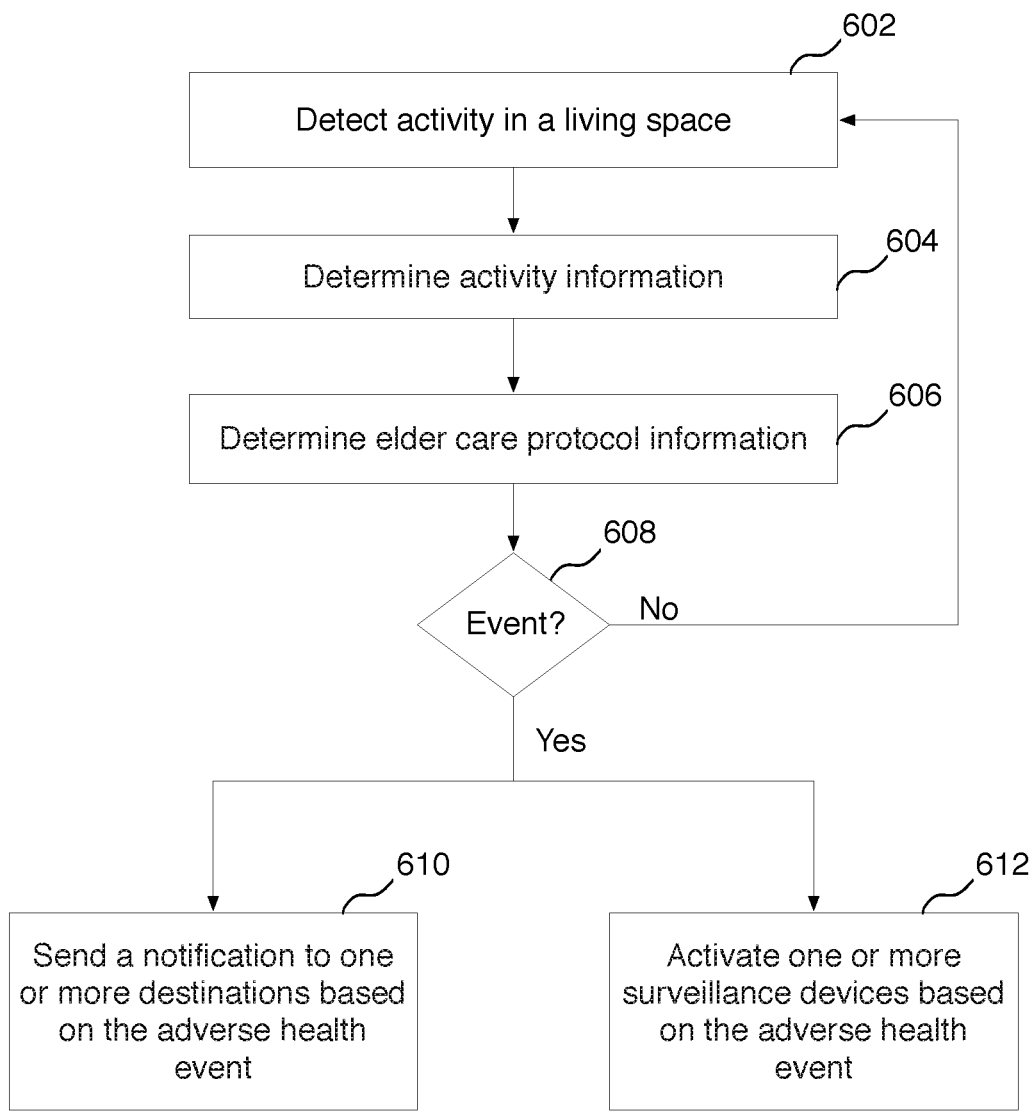
FIG. 6 illustrates an example flow diagram for operation of a health application that detects adverse health events, according to some implementations.

FIG. 6 illustrates an example flow diagram for operation of a health application that detects adverse health events, according to some implementations. Referring to both FIGS. 2 and 6, a method is initiated at block 602, where sensor device 200 detects an activity in a living space. As indicated herein, activity may include, for example, a person entering a room, a person making a motion from a still position, etc.

At block 604, sensor device 200 determines activity information. In some implementations, the activity information is associated with the activity of the person detected. For example, a person may stand up from a sitting position. The person may walk across a room. The person may enter a room from another room.

In various implementations, sensor device 200 determines the type of activity or category of activity for a given detected motion or set of motions. For example, sensor device 200 may determine that a person is sitting, standing, walking, running, jumping, moving his/her hands, etc. In various implementations, sensor device 200 may determine behavior patterns or a behavior signature of an individual.

As indicated above, in various implementations, activity and activity information generated at block 602 and block 604 may trigger the health application to perform various functionalities. For example, as described in more detail herein, in various implementations, the health application associated with sensor device 200 performs the steps of block 606 through block 612 based on the activity and activity information generated at block 602 and block 604.

As indicated herein, in various implementations, sensor device 200 exchanges activity information with other sensor devices in the network of sensor devices via a master sensor device and/or wireless router. In some implementations, sensor device 200 may function as the master device.

At block 606, sensor device 200 determines elder care protocol information. For example, seniors often have routine days. As such, sensor device 200 may learn and predict a movement patterns (e.g., using pattern recognition techniques, etc.) in order to customize elder care protocol for individual.

At block 608, sensor device 200 determines if an adverse health event has occurred. In some implementations, adverse health events may include, for example, a sudden fall, a lack of movement for longer than certain time period, etc. For example, activity collaboration among multiple sensor devices may help with adverse conditions such as a sudden fall, lack of moment for longer than a predetermined period of time, continuous moving longer than a predetermined period of time (e.g., when the person is prone to falling or a person should be taking breaks, etc.).

In some implementations, sensor device 200 learns a routine or behavior signature of a person, where the routine or signature may be defined in part by a virtual boundary in which the person typically moves. In various implementations, sensor device 200 may track an individual to determine if the person is following a typical routine. This may give a caregiver (e.g., in an assisted living scenario, etc.) or a remote family member peace of mind that the individual (e.g., senior) is okay.

In some implementations, an adverse health event may include a person moving beyond a virtual boundary. Sensor device 200 may then track the person and determine if the person breaks the routine (e.g., moves beyond a virtual boundary). For example, if the individual typically stays within a particular virtual boundary (e.g., floor, room, etc.) during particular times but all of a sudden breaks the routine. Sensor device 200 may phone a particular person (e.g., the individual being tracked, caregiver, etc.) to make sure everything is okay (e.g., the individual is not lost, etc.).

In some implementations, if no adverse health event has occurred, sensor device 200 continues to detect activities in the living space.

At block 610, if sensor device 200 determines that an adverse health event has occurred, sensor device 200 sends a notification to one or more destinations based on the adverse health event. For example, if sensor device 200 detects an adverse health event such as a sudden fall, lack of movement, etc., sensor device 200 may send a notification to a predetermined destination such as a call service, caretaker, family, etc. If the call service is an automated call service, the call service may call the person associated with the adverse health event. If that person in question answers the call, there might not be a problem (e.g., the person was simply asleep, etc.). If there is a problem, appropriate action may be taken. For example, if the person is not moving (e.g., unconscious), sensor device 200 may call an appropriate destination (e.g., call service, caretaker, family, etc.) with a notification that the call has not been answered. In another example, if the person is conscious, the person can ask for help. As such, sensor device 200 may call an appropriate destination (e.g., call service, caretaker, family, etc.) with a notification that help is needed. In either case, sensor device 200 may facilitate in a determination that the person is conscious or not moving/unconscious, needs help, etc.). In various implementations, sensor device 200 notifies how long the person has not moved, or the last time when and where person was determined to be mobile.

At block 612, if sensor device 200 determines that an adverse health event has occurred, sensor device 200 also activates one or more surveillance devices based on the adverse health event. In various implementations, the surveillance device may include video and audio devices. In various implementations, in order to minimize disruption of privacy on day-to-day basis, the video surveillance may kick in only when adverse events are detected. In some implementations, a sensor device may support a safety and security mode, which triggers a state machine to generate appropriate event notifications and alerts.

Although the steps, operations, or computations may be presented in a specific order, as shown in the example of FIG. 6, the order may be changed in particular implementations. The ordering of blocks 602 through 612 is merely one example ordering. Other orderings of the blocks/steps are possible, depending on the particular implementation. For example, blocks 610 and block 612 may occur simultaneously, or in any order.

Figure 7:
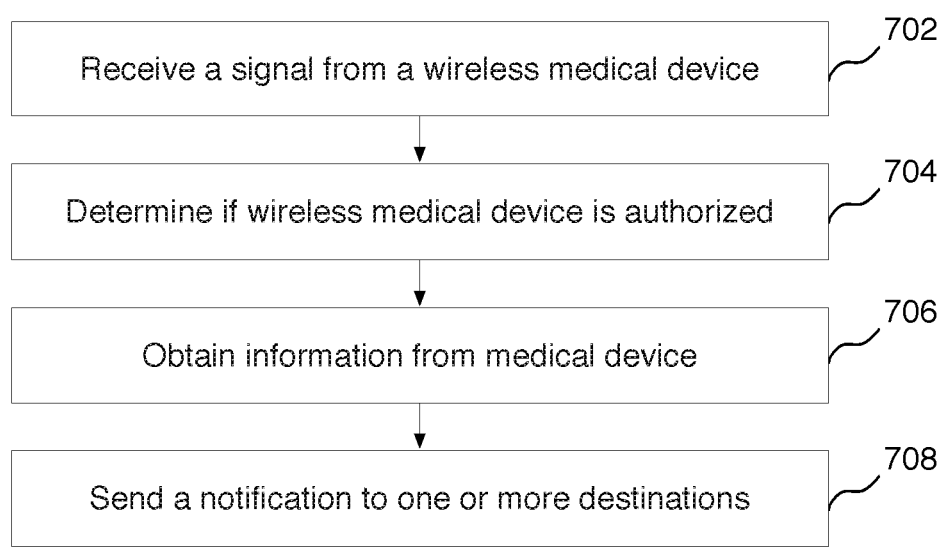
FIG. 7 illustrates an example flow diagram for operation of a health application that detects medical devices, according to some implementations.

FIG. 7 illustrates an example flow diagram for operation of a health application that detects medical devices, according to some implementations. In various implementations, residential sensor device platform 100 provides a network for medical devices. Referring to both FIGS. 2 and 7, a method is initiated at block 702, where sensor device 200 receives a signal from a wireless medical device. Such a wireless medical device may include any device (e.g., a blue tooth device) that collects medical information of an individual (e.g., heart rate monitor, blood pressure monitor, etc.).

At block 704, sensor device 200 determines if the wireless medical device is authorized. In particular, sensor device 200 checks if the wireless medical device is authorized to access the network residential sensor device platform 100.

At block 706, sensor device 200 obtains information from the medical device.

As indicated herein, in various implementations, sensor device 200 exchanges activity information with other sensor devices in the network of sensor devices via a master sensor device and/or wireless router.

At block 708, sensor device 200 sends a notification to one or more destinations. Such destinations may include, for example, a participating medical service.

Figure 8:
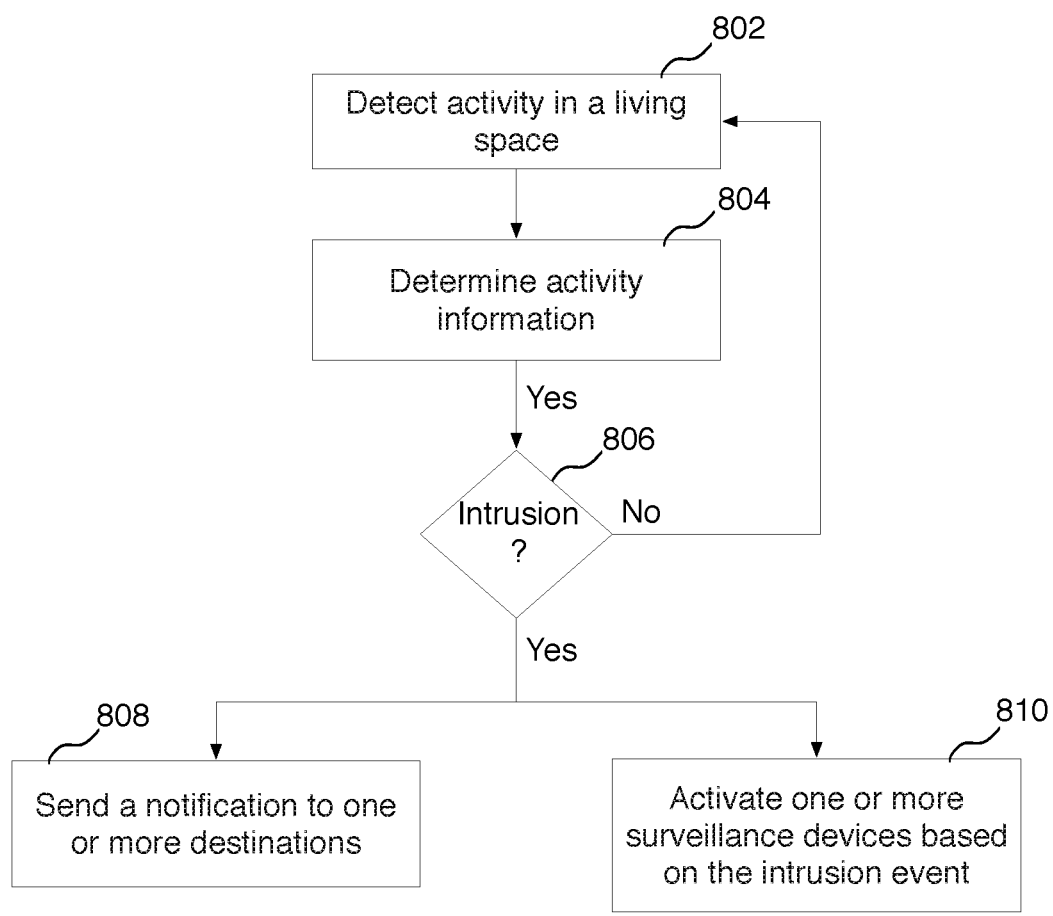
FIG. 8 illustrates an example flow diagram for operation of a security application that detects intrusion events, according to some implementations.

FIG. 8 illustrates an example flow diagram for operation of a security application that detects intrusion events, according to some implementations. Referring to both FIGS. 2 and 8, a method is initiated at block 802, where sensor device 200 detects and activity in a living space. As indicated herein, activity may include, for example, a person entering a room, a person making a motion from a still position, etc.

At block 804, sensor device 200 determines activity information. In some implementations, the activity information is based on the detected activity. For example, a person may stand up from a sitting position. The person may walk across a room. The person may enter a room from another room.

In some implementations, sensor device 200 determines if it is in vacation mode. If in vacation mode, sensor device 200 may be in a higher alert state. If not in vacation mode, sensor device 200 may be in a lower alert state.

As indicated above, in various implementations, activity and activity information generated at block 802 and block 804 may trigger the security application to perform various functions. For example, as described in more detail herein, in various implementations, the security application associated with sensor device 200 performs the steps of block 806 through block 810 based on the activity and activity information generated at block 802 and block 804.

As indicated herein, in various implementations, sensor device 200 exchanges activity information with other sensor devices in the network of sensor devices via a master sensor device and/or wireless router. In some implementations, sensor device 200 may function as the master device.

At block 806, sensor device 200 determines if an intrusion event has occurred. In some implementations, sensor device 200 determines that an intrusion event has occurred when sensor device 200 detects human activity during normal unoccupied hours and the trigger points do not reflect proper entry points into the house. In some implementations, if no intrusion event has occurred, sensor device 200 continues to detect activity in the living space.

At block 808, if sensor device 200 determines that an intrusion event has occurred, sensor device 200 sends a notification to one or more destinations based on the intrusion event. In some implementations, sensor device 200 may alert other devices collectively and make individual decision such as turning on all the lights, turning on an alarm or siren, etc.

At block 810, if sensor device 200 determines that an intrusion event has occurred, sensor device 200 also activates one or more surveillance devices based on the intrusion event. In various implementations, the surveillance device may include video and audio devices. In some implementations, a combination of room sensors and surveillance devices in different rooms may stitch together the entire inside view of the house and what is happening inside the house in case of an intrusion event.

Although the steps, operations, or computations may be presented in a specific order, as shown in the example of FIG. 8, the order may be changed in particular implementations. The ordering of blocks 802 through 810 is merely one example ordering. Other orderings of the blocks/steps are possible, depending on the particular implementation. For example, blocks 808 and block 810 may occur simultaneously, or in any order.

Figure 9:
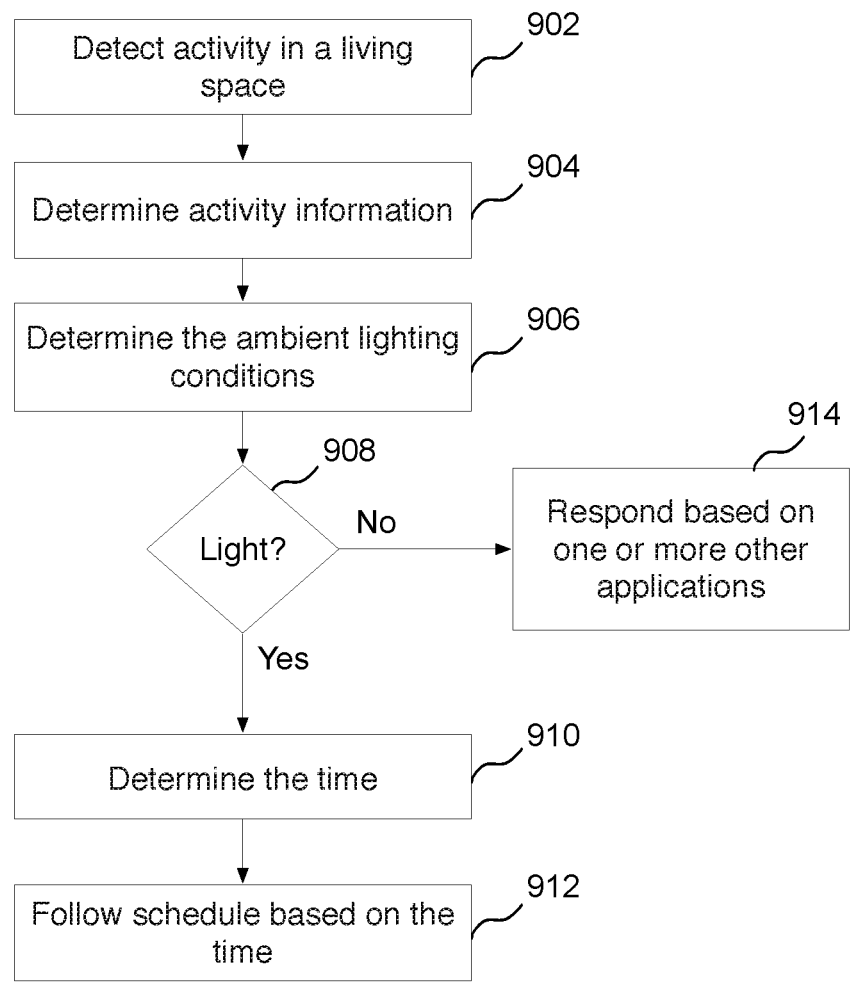
FIG. 9 illustrates an example flow diagram for operation of an energy application that facilitates energy savings associated with lighting, according to some implementations.

FIG. 9 illustrates an example flow diagram for operation of an energy application that facilitates energy savings associated with lighting, according to some implementations. Referring to both FIGS. 2 and 9, a method is initiated at block 902, where sensor device 200 detects activity in a living space. As indicated herein, activity may include, for example, a person entering a room, a person making a motion from a still position, etc.

At block 904, sensor device 200 determines activity information associated with the activity. For example, a person may stand up from a sitting position. The person may walk across a room. The person may enter a room from another room. In some implementations, sensor device 200 determines if it is in vacation mode.

As indicated above, in various implementations, activity and activity information generated at block 902 and block 904 may trigger the energy application to perform various functions. For example, as described in more detail herein, in various implementations, the energy application associated with sensor device 200 performs the steps of block 906 through block 910 based on the activity and activity information generated at block 902 and block 904.

As indicated herein, in various implementations, sensor device 200 exchanges activity information with other sensor devices in the network of sensor devices via a master sensor device and/or wireless router. In some implementations, sensor device 200 may function as the master device.

At block 906, sensor device 200 determines the ambient lighting conditions. In some implementations, if there is no light (e.g., it is dark), at block 914 sensor device 200 may respond based on one or more other applications. For example, sensor device 200 may perform functions at night. As described herein, sensor device 200 may respond based on a health application (e.g., detecting an adverse health event such as a sudden fall, etc.), may respond based on a security application (e.g., detecting an intrusion event), etc. For example, sensor device 200 may detect activity in the dark. Depending on the application and protocol, sensor device 200 may involve turning on one or more lights, sending one or more notifications, etc.

At block 908, if sensor device 200 determines there is light, sensor device 200 determines the time in block 910. For example, sensor device 200 may determine that the time is 2:00 pm, 7:00 pm, 2:00 am, etc.

At block 912, sensor device 200 follows a schedule based on the time. For example, sensor device 200 may cause changes in behavior of lights based on sensor input and the time. In various implementations, sensor device 200 may have programmable buttons that enable a user to program scenes (e.g., for mood lighting) and groups or banks of associated devices such as switches, outlets, lights, etc. In some implementations, a switch or an outlet can be part of a group member, allowing banks of other loads to operate based on sensing at different locations. For example, sensor device 200 may cause corridor lights to turn on if occupancy has been detected in a main hallway.

In some implementations, based on occupancy, time, and ambient light, sensor device 200 may turn on self-lights (e.g., lights on sensor device 200) showing its presence. Sensor device 200 may also be programmed as a night light. For example, a backlit power button may double as night light.

Sensor device 200 may also turn on the lights to a level programmed by the user for a predetermined amount of time. Based on different times of the day, each sensor device may have various settings on how a given load should behave. Sensor device 200 may have a light level indicator with self-adjusting brightness, and can detect different occupancy patterns like the behavioral change of an individual.

In some implementations, sensor device 200 may provide energy metering for power devices, and smooth dimming, where sensor device 200 understands a given load and automatically adjusts the dimming curve appropriate to the load.

In some implementations, sensor device 200 may provide industrial-grade metering capability. For example, sensor device 200 may detect different load types at a given an outlet and may provide intelligent feedback to conserve energy.

Sensor device 200 may detect high-consumption power usage on outlet and where no occupancy is detected on a switch. In some implementations, sensor device 200 may provide energy consumption information (e.g., high-consumption power usage, etc.) to the user via an indicator on sensor device 200 and/or other suitable means (e.g., a user interface console associated with sensor device 200 and/or the network.

In some implementations, sensor device 200 may have an automatic demand-response (DR) that may alert an end user of potential higher utility rates and/or prevents usage during DR timing. In some implementations, sensor device 200 may provide sophisticated dimming control, where sensor device 200 detects different load types and dynamically adjusts dimming curve appropriate for each load. Dimming may be switched off via software for non-dimming loads.

The following are example use cases. In one scenario, if a given sensor device detects activity at 2:00 pm and there is sufficient surrounding natural light, the sensor device does not perform any load control.

In some implementations, if a given sensor device detects activity at 2:00 pm and there is not sufficient surrounding natural light (e.g., blinds closed), the sensor device may perform load control (e.g., load control turned on at initial day level).

In some implementations, if a given sensor device detects activity at 7:00 pm and there is not sufficient surrounding natural light (e.g., night time), the sensor device may perform load control (e.g., load control turned on at initial dusk level).

In some implementations, a given switch may determine, for example, if a user dims the light repeatedly and keeps it at the same level when turned on. The sensor device in the switch tracks the usage behavior or patterns. The sensor device may, for example, determine that the user dims the light between predetermined time intervals and determines how much the user dims light. The sensor device may also determine that the switch usually turns on at predetermined times. The sensor device learns and stores this behavior.

In some implementations, if a given sensor device monitors the load of an outlet and detects a particular type of load (e.g., room heater, night lamp etc.), the sensor device may perform particular actions depending on the particular scenario. For example, if the load is high wattage and there is no activity in the room, the sensor device may implement a state machine to generate appropriate event notifications. If the load is high wattage and continuously running for a long time with activity in the room, the sensor device may implement a state machine to generate appropriate event. In some implementations, if the load is low wattage, the sensor device takes no action. In some implementations, the sensor device may detect load information such as load type, make, model, etc., and the sensor device may implement a state machine to generate appropriate actions based on the load information.

In some implementations, if in vacation mode, sensor device 200 may be in a higher energy conversation state. If not in vacation mode, sensor device 200 may be in a lower energy conversation state.

Although the steps, operations, or computations may be presented in a specific order, as shown in the example of FIG. 9, the order may be changed in particular implementations. The ordering of blocks 902 through 910 is merely one example ordering. Other orderings of the blocks/steps are possible, depending on the particular implementation. For example, blocks 906 and block 908 may occur simultaneously, or in any order.

Figure 10:
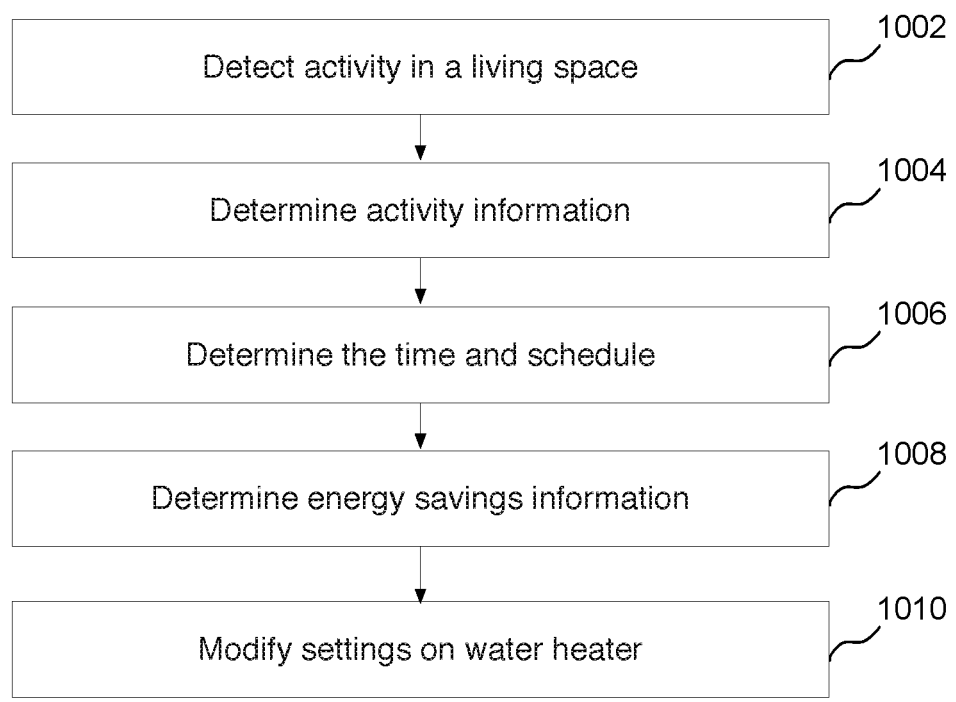
FIG. 10 illustrates an example flow diagram for operation of an energy application that facilitates energy savings associated with a water heater, according to some implementations.

FIG. 10 illustrates an example flow diagram for operation of an energy application that facilitates energy savings associated with a water heater, according to some implementations. Referring to both FIGS. 2 and 10, a method is initiated at block 1002, where sensor device 200 detects activity in a living space. As indicated herein, activity may include, for example, a person entering a room, a person making a motion from a still position, etc.

At block 1004, sensor device 200 determines activity information associated with the activity. For example, a person may stand up from a sitting position. The person may walk across a room. The person may enter a room from another room. In some implementations, sensor device 200 determines if it is in vacation mode.

As indicated above, in various implementations, activity and activity information generated at block 1002 and block 1004 may trigger the security application to perform various functions. For example, as described in more detail herein, in various implementations, the security application associated with sensor device 200 performs the steps of block 1006 through block 1010 based on the activity and activity information generated at block 1002 and block 1004.

As indicated herein, in various implementations, sensor device 200 exchanges activity information with other sensor devices in the network of sensor devices via a master sensor device and/or wireless router. In some implementations, sensor device 200 may function as the master device.

At block 1006, sensor device 200 determines the time and schedule.

At block 1008, sensor device 200 determines energy savings information.

At block 1010, sensor device 200 modifies settings on a water heater. For example, a heater or water heater of the residence can be independently controlled based upon sensed occupancy within the residence. In various implementations, various appliances of a residence such as a heater, water heater, etc., may be independently controlled based on predictability of the residence being occupied (e.g., learning behavior, etc.). Implementations may provide thermostat control to control temperature.

In some implementations, if in vacation mode, sensor device 200 may be in a higher energy conversation state. If not in vacation mode, sensor device 200 may be in a lower energy conversation state.

Although the steps, operations, or computations may be presented in a specific order, as shown in the example of FIG. 10, the order may be changed in particular implementations. The ordering of blocks 1002 through 1010 is merely one example ordering. Other orderings of the blocks/steps are possible, depending on the particular implementation. For example, blocks 1006 and block 1008 may occur simultaneously, or in any order.

Figure 11:
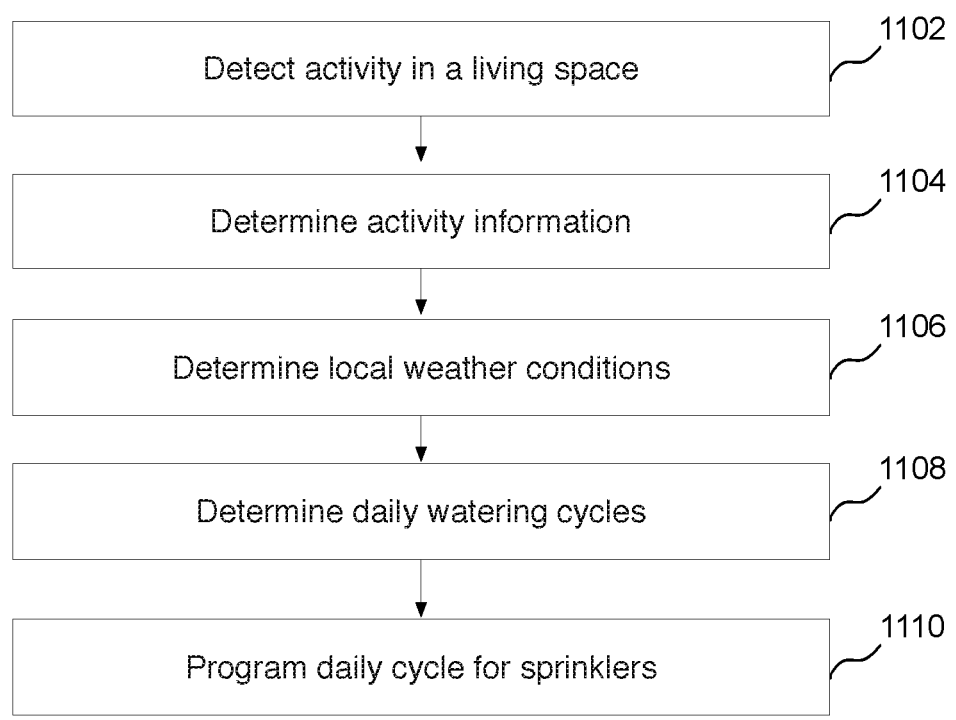
FIG. 11 illustrates an example flow diagram for operation of an energy application that facilitates energy savings associated with water sprinklers, according to some implementations.

FIG. 11 illustrates an example flow diagram for operation of an energy application that facilitates energy savings associated with water sprinklers, according to some implementations. Referring to both FIGS. 2 and 11, a method is initiated at block 1102, where sensor device 200 detects activity in a living space. As indicated herein, activity may include, for example, a person entering a room, a person making a motion from a still position, etc.

At block 1104, sensor device 200 determines activity information associated with the activity. For example, a person may stand up from a sitting position. The person may walk across a room. The person may enter a room from another room. In some implementations, sensor device 200 determines if it is in vacation mode.

As indicated above, in various implementations, activity and activity information generated at block 1102 and block 1104 may trigger the security application to perform various functions. For example, as described in more detail herein, in various implementations, the security application associated with sensor device 200 performs the steps of block 1106 through block 1110 based on the activity and activity information generated at block 1102 and block 1104.

As indicated herein, in various implementations, sensor device 200 exchanges activity information with other sensor devices in the network of sensor devices via a master sensor device and/or wireless router. In some implementations, sensor device 200 may function as the master device.

At block 1106, sensor device 200 determines the local weather conditions. In some implementations, sensor device 200 may obtain the local weather conditions from a local weather station or any other suitable source of whether information. Sensor device 200 may obtain data based on zip code for type of soil, moisture, Internet weather information (e.g., forecasts for temperature, rain, winds, etc.), etc.

At block 1108, sensor device 200 determines the daily watering cycles. Based on user information about his or her garden, sensor device 200 may gather intelligence to compute daily watering cycles. In some implementations, sensor device 200 may control the water flow for sprinklers based on the local weather conditions. In some implementations, sensor device 200 may also obtain information such as drought situations, water peak usage, pricing, etc.

At block 1110, sensor device 200 programs the daily cycle for sprinklers. In various implementations, sensor device 200 may change settings on the water heater in order to save energy. Based on indoor activity, sensor device 200 may determine the optimal timing for sprinklers to turn on and not disturb the occupants. Furthermore, sensor device 200 may with assistance from an upstream server initiation predetermined watering cycles based on zip code, soil type, and plant or tree type, etc. Also add based on sensing could detect a wild animal like deer and enable animal deterrent sprinkler system to scare animal away.

Further, conditions within the residence may be sensed. For example, the sensor devices may be used to detect a water leak or a gas leak. Once detected, occupancy sensed within the residence can trigger an alarm to alert residents. In various implementations, the sensor network may also detect leaks and failure of water pumps, borewells, swimming pool apparatuses, sprinklers, air conditioning, washing machines, stoves, dishwashers or any other appliances or apparatuses. In some implementations, the sensor network may also detect air quality (e.g., dust, dangerous gasses such as carbon monoxide, natural gas, radon, etc.) in order to address health concerns (e.g., asthma, etc.).

In some implementations, if in vacation mode, sensor device 200 may be in a higher energy conversation state. If not in vacation mode, sensor device 200 may be in a lower energy conversation state.

In various implementations, each sensor device independently analyzes and learns user behavior and usage patterns, and stores the behavior and usage patterns. In some implementations, a given device determines when a user dims the lights and by how much.

Although the steps, operations, or computations may be presented in a specific order, as shown in the example of FIG. 11, the order may be changed in particular implementations. The ordering of blocks 1102 through 1110 is merely one example ordering. Other orderings of the blocks/steps are possible, depending on the particular implementation. For example, blocks 1106 and block 1108 may occur simultaneously, or in any order.

Implementations described herein provide various benefits. For example, implementations described herein also automate residential environments, as well as optimize power usage in residential environments. Implementations provide switches, where each switch functions as an ideal docking station for a sensor platform for providing many Internet of Things (IoT) features for residence automation.

Figure 12:
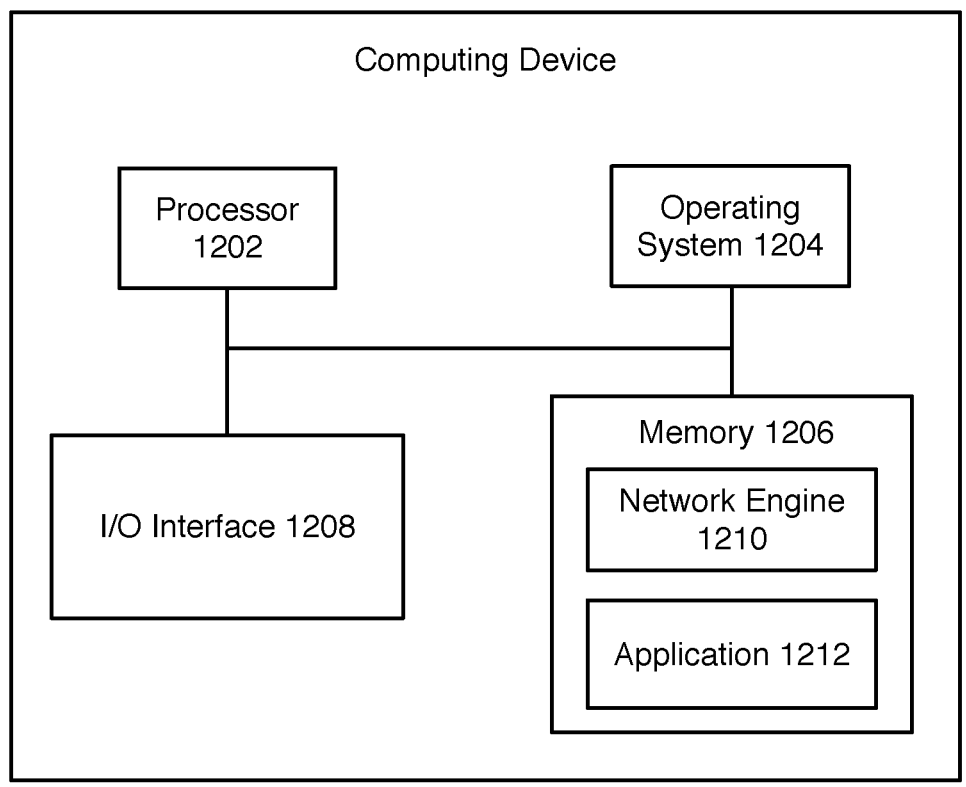
FIG. 12 illustrates a block diagram of an example computing device, according to some implementations.

FIG. 12 illustrates a block diagram of an example computing device 1200, according to some implementations. For example, computing device 1200 may be used to implement a sensor device of FIG. 1 and/or sensor device 200 of FIG. 2, as well as to perform the method implementations described herein. In some implementations, computing device 1200 includes a processor 1202, an operating system 1204, a memory 1206, and an input/output (I/O) interface 1208. Computing device 1200 also includes a network engine 1210 and an application 1212, which may be stored in memory 1206 or on any other suitable storage location or computer-readable medium. Application 1212 provides instructions that enable processor 1202 to perform the functions described herein and other functions. For ease of illustration, one application 1212 is shown. Application 1212 may represent multiple applications. For example, multiple applications such as a health application, a security application, an energy application, etc. may be stored in memory 1206 and executed by processor 1202.

For ease of illustration, FIG. 12 shows one block for each of processor 1202, operating system 1204, memory 1206, I/O interface 1208, network engine 1210, and application 1212. These blocks 1202, 1204, 1206, 1208, 1210, and 1212 may represent multiple processors, operating systems, memories, I/O interfaces, network engines, and applications. In other implementations, computing device 1200 may not have all of the components shown and/or may have other elements including other types of elements instead of, or in addition to, those shown herein.

Although the description has been described with respect to particular implementations thereof, these particular implementations are merely illustrative, and not restrictive. Concepts illustrated in the examples may be applied to other examples and implementations. For example, some implementations are described herein in the context of a wireless mesh network system. However, the implementations described herein may apply in contexts other than a wireless mesh network.

Note that the functional blocks, methods, devices, and systems described in the present disclosure may be integrated or divided into different combinations of systems, devices, and functional blocks as would be known to those skilled in the art.

In some implementations, a non-transitory computer-readable storage medium carries program instructions thereon, where the instructions when executed by one or more processors cause the one or more processors to perform operations including one or more of the steps described herein.

In some implementations, a method includes one or more means for performing one or more of the steps described herein.

In some implementations, a system includes one or more processors, and logic encoded in one or more tangible media for execution by the one or more processors. When executed, the logic is operable to perform operations including one or more of the steps described herein.

In some implementations, a system includes a storage device, and one or more processors accessing the storage device and operable to perform operations including one or more of the steps described herein.

The foregoing description includes references to the accompanying drawings, which form a part of the detailed description. The drawings show specific implementations by way of illustration. In the various descriptions, these embodiments are also referred to herein as "implementations" and/or "examples." Such examples may include elements in addition to those shown or described. Such examples may optionally omit some elements mentioned. Moreover, such examples may include any combination or permutation of those elements shown or described (or one or more aspects thereof).

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or on multiple processors. Although the steps, operations, or computations may be presented in a specific order, the order may be changed in particular embodiments. In some particular embodiments, multiple steps shown as sequential in this specification may be performed at the same time.

Particular embodiments may be implemented in a computer-readable storage medium (also referred to as a machine-readable storage medium) for use by or in connection with an instruction execution system, apparatus, system, or device. Particular embodiments may be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), solid state memory (e.g., flash memory, etc.), or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, etc.

Particular embodiments may be implemented by using a programmed general purpose digital computer, by using application specific integrated circuits, programmable logic devices, field programmable gate arrays, optical, chemical, biological, quantum or nanoengineered systems, components and mechanisms. In general, the functions of particular embodiments may be achieved by any means known in the art. Distributed, networked systems, components, and/or circuits may be used. Communication or transfer of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that is stored in a machine-readable medium to permit a computer to perform any of the methods described above.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, they are intended to cover various modifications and similar arrangements as would be apparent to those skilled in the art. Therefore, the scope of the appended claims should be accorded the broadest interpretation so as to encompass all such modifications and similar arrangements.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A residential electrical switch sensor device platform comprising:
    a plurality of sensor devices, wherein each sensor device of the plurality of sensor devices communicates with a wireless router and with other sensor devices of the plurality of sensor devices, and wherein each sensor device includes one or more sensors operative to sense conditions in a living space and includes one or more processors operative to perform operations comprising:
    determining one or more conditions in the living space, wherein at least one condition of the one or more conditions is associated with activity in the living space;
    sharing, with the other sensor devices, information associated with the one or more conditions;
    enabling a first sensor device of the plurality of sensor devices to control the other sensor devices, wherein the first sensor device functions as a wireless master multi-way switch that controls one or more electrical switches through controlling electrical controls of the other sensor devices;
    monitoring the activity in the living space using surveillance devices, wherein the surveillance devices comprise video devices and audio devices;
    stitching together an inside view of the living space and the activity in the living space based on data from the surveillance devices, wherein the activity comprises one or more of motions within a room, movement from location to location within a room, and movement from room to room in the living space; and
    controlling one or more operations of one or more electrical controls based at least in part on the information associated with the one or more conditions.

2. The residential sensor device platform of claim 1, wherein the sharing of information associated with the one or more conditions is based at least in part on one or more attributes associated with the other sensor devices.

3. The residential sensor device platform of claim 1, wherein the one or more electrical controls control one or more non-sensor devices that communicate with at least a portion of the plurality of sensor devices of a wireless mesh network.

4. The residential sensor device platform of claim 1, wherein the first sensor device functions as a master sensor device, wherein the other sensor devices functions as slave sensor devices, and wherein one or more processors are further operative to perform operations comprising:
    communicating with the wireless router; and
    forming a wireless mesh network with the other sensor devices through wireless communication with the other sensor devices through the wireless router.

5. The residential sensor device platform of claim 1, wherein one or more processors are further operative to perform operations comprising controlling operation of one or more electrical controls based at least in part on the information associated with the one or more conditions.

6. The residential sensor device platform of claim 1, wherein one or more processors are further operative to perform operations comprising optimizing one or more software applications based at least in part on the information associated with the one or more conditions.

7. A sensor device comprising:
    one or more processors;
    one or more sensors operative to sense conditions in a living space; and
    logic encoded in one or more non-transitory computer-readable storage media for execution by the one or more processors and when executed operable to cause the one or more processors to perform operations comprising:
    determining one or more conditions in the living space, wherein at least one condition of the one or more conditions is associated with activity in the living space;
    sharing, with other sensor devices, information associated with the one or more conditions;
    enabling a first sensor device of the plurality of sensor devices to control the other sensor devices, wherein the first sensor device functions as a wireless master multi-way switch that controls one or more electrical switches through controlling electrical controls of the other sensor devices;
    monitoring the activity in the living space using surveillance devices, wherein the surveillance devices comprise video devices and audio devices;
    stitching together an inside view of the living space and the activity in the living space based on data from the surveillance devices, wherein the activity comprises one or more of motions within a room, movement from location to location within a room, and movement from room to room in the living space; and
    controlling one or more operations of one or more electrical controls based at least in part on the information associated with the one or more conditions.

8. The sensor device of claim 7, wherein the sharing of information associated with the one or more conditions is based at least in part on one or more attributes associated with the other sensor devices.

9. The sensor device of claim 7, wherein the one or more electrical controls control one or more non-sensor devices that communicate with at least a portion of the other sensor devices of a wireless mesh network.

10. The sensor device of claim 7, wherein the one or more electrical controls control one or more electrical power outlets and/or one or more electrical switches.

11. The sensor device of claim 7, wherein the logic when executed is further operable to cause the one or more processors to perform operations comprising:
 functioning as a master sensor device from a plurality of sensor devices, wherein the other sensor devices of the plurality of sensor devices are designated as slave sensor devices;
 communicating with the wireless router; and
 forming a wireless mesh network with the other sensor devices through wireless communication with the other sensor devices through the wireless router.

12. The sensor device of claim 7, wherein the logic when executed is further operable to cause the one or more processors to perform operations comprising controlling one or more operations of one or more electrical controls based at least in part on the information associated with the one or more conditions.

13. The sensor device of claim 7, wherein the logic when executed is further operable to cause the one or more processors to perform operations comprising optimizing one or more software applications based at least in part on the information associated with the one or more conditions.

14. A method of operation of a residential sensor device platform, the method comprising:
 determining one or more conditions in a living space, wherein at least one condition of the one or more conditions is associated with activity in the living space;
 sharing, with other sensor devices of a plurality of sensor devices, information associated with the one or more conditions;
 enabling a first sensor device of the plurality of sensor devices to control the other sensor devices, wherein the first sensor device functions as a wireless master multi-way switch that controls one or more electrical switches through controlling electrical controls of the other sensor devices;
 monitoring the activity in the living space using surveillance devices, wherein the surveillance devices comprise video devices and audio devices;
 stitching together an inside view of the living space and the activity in the living space based on data from the surveillance devices, wherein the activity comprises one or more of motions within a room, movement from location to location within a room, and movement from room to room in the living space; and
 controlling one or more operations of one or more electrical controls based at least in part on the information associated with the one or more conditions.

15. The method of claim 14, wherein the sharing of information associated with the one or more conditions is based at least in part on one or more attributes associated with the other sensor devices.

16. The method of claim 14, wherein the one or more electrical controls control one or more non-sensor devices that communicate with at least a portion of a plurality of sensor devices of a wireless mesh network.

17. The method of claim 14, wherein the one or more electrical controls control one or more electrical power outlets and/or one or more electrical switches.

18. The method of claim 14, wherein the first sensor device functions as a master sensor device, and wherein the other sensor devices functions as slave sensor devices, the method further comprising:
 communicating with a wireless router; and
 forming a wireless mesh network with the other sensor devices through wireless communication with the other sensor devices through the wireless router.

19. The method of claim 14, further comprising controlling operation of one or more electrical controls based at least in part on the information associated with the one or more conditions.

* * * * *